United States Patent [19]

Anderson

[11] Patent Number: 5,317,834
[45] Date of Patent: Jun. 7, 1994

[54] AGRICULTURAL PROCESSES AND PRODUCTS

[75] Inventor: Neil C. Anderson, Monterey, Calif.

[73] Assignee: Matrix Industries, Inc., Vernon, Canada

[21] Appl. No.: 713,125

[22] Filed: Jun. 10, 1991

Related U.S. Application Data

[62] Division of Ser. No. 235,116, Aug. 22, 1988.

[51] Int. Cl.⁵ ............................................. A01G 29/00
[52] U.S. Cl. .................................... 47/48.5; 71/64.11
[58] Field of Search ............... 47/58, 57.5, 1.01, 485, 47/56, 1.1, 9; 71/61.11, 61.13, 904

[56] References Cited

U.S. PATENT DOCUMENTS

| | | |
|---|---|---|
| 3,223,518 | 8/1961 | Hansen . |
| 3,373,009 | 3/1968 | Pruitt et al. . |
| 3,710,510 | 1/1973 | Tully et al. . |
| 3,973,355 | 8/1976 | McKenzie . |
| 3,985,616 | 10/1976 | Weaver et al. . |
| 4,055,974 | 11/1977 | Jackson, Jr. . |
| 4,402,725 | 9/1983 | Heller et al. . |
| 4,540,427 | 9/1985 | Helbling . |
| 4,579,578 | 4/1986 | Cooke . |
| 4,605,550 | 8/1986 | Trill ...................................... 71/904 |
| 4,752,317 | 6/1988 | Detroit ............................... 71/64.11 |

FOREIGN PATENT DOCUMENTS 596813  6/1982  Japan .......................................... 47/9

OTHER PUBLICATIONS

What Is Nitroform, Noram Chemical Co., Wilmington, DE, pp. 18–32.
Bulletin No. 0787/MS/15M, Sierra Chemical Co., 1001 Yosemite Drive, Milpitas, CA 95035.
Kirk–Othmer, Encyclopedia of Chemical Technology, Third Edition, John Wiley & Sons, New York, 1984, pp. 645–647.

Primary Examiner—Ramon S. Britts
Assistant Examiner—Joanne C. Downs
Attorney, Agent, or Firm—Hughes & Multer

[57] ABSTRACT

Methods for promoting the survivability and growth of seeds and seedlings which employ a fertilizer or a synergistic combination of a fertilizer and a moisture absorbing polymer which furnishes a reservoir of the moisture needed for plant growth and also provides a growth medium for soil bacteria relied upon to break down and release nitrogen from the fertilizer molecules. Systems for delivering these formulations and for verifying the delivery of the material.

12 Claims, 2 Drawing Sheets

AGRICULTURAL PROCESSES AND PRODUCTS

RELATED APPLICATION

This application is a division of application Ser. No. 235,116 filed 22 Aug. 1988.

TECHNICAL FIELD OF THE INVENTION

The present invention relates to novel, improved methods and systems for making plant nutrients and moisture, or both, available to seeds and seedlings in a manner that will promote the growth and survivability of the seed or seedling.

BACKGROUND OF THE INVENTION

Over the years, a number of techniques for making plant nutrients and moisture available to seeds and seedlings have been proposed.

One of these heretofore proposed techniques involves the use of a hygroscopic or moisture absorbent composition to retain moisture which is later released for uptake by the seeds of seedling. Specific, representative techniques of this character are described in U.S. Pat. Nos. 3,710,510 issued 16 Jan. 1973 to Tully et al. for PLANT GROWTH MEDIA AND METHODS and 4,540,427 issued 10 Sep. 1985 to Helbling for METHOD FOR IMPROVING WATER RETENTION PROPERTIES OF SOIL AND AN AGENT FOR PERFORMING THIS METHOD. This approach to promoting plant growth and survivability has the obvious, and significant, drawback that it does nothing to ensure that the plant nutrients needed for survivability and growth are made available to the seed or seedling being grown.

Self-contained systems which, at least theoretically, have the potential for remedying this lack and making both nutrients and moisture available to seeds and seedlings are disclosed in U.S. Pat. Nos. 3,373,009 issued 12 Mar. 1968 to Pruitt et al. for NUTRIENT PLANT MATRIX; 3,973,355 issued 10 Aug. 1976 to McKenzie for SELF-CONTAINED HYDROPHILIC PLANT GROWTH MATRIX AND METHOD; 4,055,974 issued 1 Nov. 1977 to Jackson, Jr. for DISINTEGRATABLE FERTILIZER TABLET; 4,402,725 issued 6 Sep. 1983 to HELLER et al. for FERTILIZERS; and 4,579,578 issued 1 Apr. 1986 to Cooke for FERTILIZERS.

While the approaches to promoting plant growth and survivability disclosed in the foregoing patents do have the potential for providing both moisture and plant nutrients, it is not clear that they have the capability of doing so effectively or at a cost which would allow them to be used on a large scale.

These drawbacks become particularly acute in applications such as silviculture in which a high degree of survivability is needed for reforestation to be economically practical.

At present, the most common method of replanting logged-over areas is with bare root or container grown seedlings. These are nursery grown for a specific period of time. Upon reaching an acceptable size and point in their growth, the seedlings are removed from the containers in which they were grown or lifted from the nursery field and either placed in cold storage or transplanted directly at the site. Planting is normally done for a short period of time in the Spring and occasionally in the Fall.

During the first year of outplanting, the seedling rarely experiences any growth and at best struggles to survive the transplant shock. The root system is busy attempting to re-establish itself in an alien soil often void of any nutrient amendments, and it is vulnerable to any moisture shortage. If the seedling survives, it will most likely enter into a premature dormancy stage and experience a total lack of growth in the first year.

During the second year, conditions should improve. However, the transplanted seedling still has much to overcome before it is assured of developing into a potential sawlog. At this stage, the seedling is rooted in native soil that rarely has optimum nutrient and moisture levels. In addition, the seedling must compete with established, more aggressive native plants for moisture and nutrients. It will commonly take three to ten years of struggle before the transplant will be established as the dominant species on the site.

Thus, economically viable systems which will enable a seedling to survive transplant shock and develop into a healthy, dominant plant are of considerable economic importance to, for example, those areas of the world which have a lumber industry.

SUMMARY OF THE INVENTION

There have now been invented, and disclosed herein, certain new and novel systems for and methods of promoting the growth and survivability of seeds and seedlings which meet the requirements discussed above in that they are: (1) economically viable, and (2) capable of nurturing a seed or seedling into a plant that can survive in the soil in which it is planted and become the dominant specie in its area, allowing it to compete successfully for nutrients and moisture.

In one respect, this novel approach to the promotion of plant growth and survivability involves planting with the seed or seedling a urea-formaldehyde fertilizer or a fertilizer such as isobutyliedene diurea, crotonylidene urea, a sulfur coated urea, a resin coated, controlled release fertilizer such as Osmocote or Nutricote, a mixture of urea-formaldehyde fertilizers with different release rates, or a mixture of at least two of the foregoing.

In another aspect, the present involves the synergistic use of: (1) a urea-formaldehyde fertilizer or a mixture of such fertilizers as described in the preceding paragraph; (2) a hygroscopic, moisture supplying composition plus, typically; and (3) conventional compounds for supplying potassium, phosphorous, and/or micronutrients and adjuncts to promote the growth of and establish seedlings.

It was pointed out above that others have heretofore proposed plant growth promoting systems that include both a hygroscopic composition and plant nutrients. In one important respect, the systems of that character disclosed herein differ from those previously proposed by the just-discussed inclusion of an urea-formaldehyde fertilizer capabilities.

Polymerized urea-formaldehydes provide a relatively inexpensive source of nitrogen, an essential plant nutrient; are unapt to burn or otherwise adversely affect the growth of plants fertilized by them; and make nitrogen available over an extended period of time. Urea-formaldehydes useable as sources of plant food nitrogen are urea and formaldehyde reaction products which contain molecules with varying degrees of solubility. The nitrogen in these molecules is released— or made available—to growing plants such as seedlings by soil bacteria. These bacteria convert the nitrogen in first and most soluble and then progressively more insoluble ones of the urea-formaldehyde molecules to a form in which the nitrogen can be taken up and utilized by growing plants.

Urea-formaldehyde fertilizers are characterized by specifications including insoluble nitrogen (CWIN) and activity index (AI). The first of these factors in indicative of the amount of nitrogen in the fertilizer that cannot be immediately dissolved, and activity index is an empirical value that reflects the rate at which the nitrogen in the more insoluble fractions of the urea-formaldehyde fertilizer will become available to the growing plant. By controlling the reactions between the urea and the formaldehyde, urea-formaldehydes with a targeted OWIN and AI and, therefore, a gradual, controlled release rate of plant available nitrogen over an extended period can be produced. Such fertilizers are commercially available at reasonable cost and in the solid forms employed in the present invention such as prills and granules. Other important advantages of urea-formaldehyde fertilizers, as far as the present invention is concerned, are its lack of volatility and its resistance to leaching.

As discussed above, the action of soil bacteria is required to convert the nitrogen in urea-formaldehyde fertilizers to a plant available form; i.e., a form in which it can be utilized by a growing plant. It has unexpectedly been found that the hygroscopic compositions heretofore employed in combination with other fertilizers—as by the patentees identified above—provide an important and unanticipated function when combined with urea-formaldehyde fertilizers. They serve both as a reservoir for moisture and as a highly effective host or growth medium for the soil bacteria relied upon to break the urea-formaldehyde molecules down and release the chemically bound nitrogen from those molecules in a form usable by a growing plant. The consequence of this is a continuing source of soil bacteria and efficient utilization of the nitrogen source in situations, commonly occurring in applications such as reforestation, where the soil is typically deficient in nutrients and dry and the continuing presence of soil bacteria in a number sufficient to allow urea-formaldehyde fertilizers to be used cannot otherwise be guaranteed.

Thus, by employing the principles of the present invention, nitrogen in a form and in quantities sufficient to promote rapid growth is made available during those periods in which a plant is in the active phase of its growth cycle and over an extended period of time. This period of nitrogen availability may span more than one growing cycle and may even be several years.

Another advantage of the novel, herein disclosed technique of promoting plant growth by an intimate combination of hygroscopic material and urea-formaldehyde fertilizer is that bacterial action is promoted to as least a predominant extent only during those periods when the plant is in the active stage of its annual growth cycle and that release of the chemically bound nitrogen is inhibited when the plant is not growing. This is important because it conserves, and thus minimizes, the amount of urea-formaldehyde fertilizer that must be supplied to ensure establishment of a seed or seedling. Particularly in large-scale operations this is economically significant because of the cost of the fertilizer and the expense involved in storing, delivering, and handling it.

Still another advantage of formulations with the preferred, urea-formaldehyde fertilizers is that they are not poisonous to living plants as inorganic nitrogen sources are at application rates which are not very much higher than the optimum application rates.

Yet another important advantage of the present invention is that it significantly extends the planting season in reforestation and similar applications. Particularly in less temperate zones and/or at high altitudes, the periods in which seedlings can be outplanted with a reasonable expectation of survival are often very short because the weather must be warm and adequate moisture must be present so that the plant can become established before the weather becomes hotter and the plant enters the dormant phase of its growth cycle.

Typically, this planting window will exist only in late Spring and for only a few weeks. Spring transplants generally suffer from shock and/or dessication in all but the wettest summers. Because of the shock of transplant and the ensuing loss of growth, survival rates are often low. Fall transplants often experience frost heaving and accompanying mortality.

Because the novel systems disclosed herein are designed to, and capable of, storing moisture and subsequently making that moisture and plant nutrients available to a plant when that plant enters the active phase of its annual growth cycle, the time span of this window is greatly increased—in effect from that time in the Spring when snow has melted and sufficient frost has left the ground to permit outplanting until the ground freezes late in the year or snow returns. The system in such cases stores moisture but otherwise remains inactive until the conditions arise which result in the plant entering the active phase of its annual cycle later in the same year (early outplanting) or the following year (late outplanting). Only at that time, and because of its novel and synergistic properties, will the system release nutrients to the plant which can also then tap the reservoir of moisture made available to the plant in accord with the principles of the present invention.

Mixtures of hydrophilic, water absorbing gels and urea-formaldehyde fertilizers have heretofore been made available in the form of hard, dense tablets; and such tables (commonly known as fertilizer spikes and used to establish landscapes) are described in U.S. Pat. No. 4,055,974 issued 1 Nov. 1977 to Jackson, Jr. for DISINTEGRATABLE FERTILIZER TABLES. These tablets are, at best, of only limited utility because optimum conditions, including large amounts of ground moisture, are needed to disintegrate these tablets and release and thereby activate their constitutes at a rate which is compatible with the promotion of plant growth and survivability.

The herein disclosed nutrient and moisture/nutrient supplying systems can be simply dumped or otherwise deposited in the hole in which the seed or seedling is to be planted.

Preferably, however, and particularly in reforestation and similar applications, these components are packaged in a container that is designed to be planted with the seedling or a seed from which the seedling can be germinated. This novel delivery system has a number of important advantages. First it allows an optimum amount of material to be delivered to each seed or seedling, an advantage of obvious importance as it allows sufficient material to establish a plant to be delivered at the lowest cost. Second, the material can be much more easily handled in this type of system. Third, and particularly important in applications such as reforestation, an indicator affixed to the receptacle as by a connecting string can be located above ground in the course of burying the receptacle and transplanting the seedling, making it easy to confirm that the receptacle containing the nutrient and moisture supplying materials was actually emplaced with the plant being supported.

A physically somewhat similar delivery system employs: (1) a pillow housing the nutrient or nutrient-/moisture supplying and any other constituents employed to promote survivability and growth of a plant, and (2) a seed bonded to the pillow. This pillow is placed on the ground rather than being buried like the baglike receptacles discussed above. This surface planting increases productivity, yet the system efficiently provides that support in the form of moisture and nutrients necessary for a high rate of survival and strong and rapid growth.

Seeds are commonly germinated in containers in greenhouses and hothouses and in similar environments where conditions favoring germination and subsequent growth of the plant can be provided. In such circumstances, the nutrient/moisture providing constituents of the invention can in many cases advantageously be incorporated in the material in which the seeds are germinated or in the walls of the container in which they are germinated. The grown out seedling is then transplanted in its container, making a continuing source of moisture and nutrients available to the seedling and promoting its establishment as the dominant species in the soil to which it is transplanted.

In another respect, the present invention relates to planting techniques utilizing bags or receptacles of the character described above and designed for both surface and subsurface planting in circumstances where supplementary moisture is not needed. In these circumstances—involving adequate rainfall and/or irrigation—the moisture absorber is not employed, and the receptacle will contain only plant nutrients as described above and such adjuncts and other constituents as may be desirable.

OBJECTS OF THE INVENTION

From the foregoing, it will be apparent to the reader that one important and primary object of the present invention resides in the provision of novel, improved methods and systems for promoting the growth and survivability of seeds and seedlings.

Related and also important objects of the invention reside in the provision of plant nurturing methods and systems in accord with the preceding object:

which tend to make plant nutrients available only during those periods in which the nurtured plant is growing, thereby minimizing the amount of active material that must be provided to ensure continued fertilization over a designated, extended period of time;

which are capable of significantly extending the planting season;

which deliver the active constituents in a manner that makes them easy to handle, yet results in these constituents being located in the desired, close, proximate relationship to the roots of the plant being nurtured;

which are particularly suitable for reforestation and other large-scale application;

which employ a synergistic combination of an urea-formaldehyde or other, slow or controlled release nitrogen supplying fertilizer and a water absorbent composition to make nitrogen and moisture available to the plants being supported;

which employ a microbially degradable fertilizer and a growth medium for, and thereby help to ensure, an adequate and continuing supply of soil microbes for breaking the fertilizer molecules down and making their nitrogen available in a plant available form;

which allow a wide variety of useful adjuncts to be employed;

which are particularly useful in areas in which the soil is deficient in nutrients and/or rainfall is sporadic and/or light;

which are readily useful in surface planting techniques;

which deliver the active constituents in a manner furnishing visual confirmation of delivery; and which are readily adaptable to tray- and bench-type seed germination and growing out processes.

Yet another important and primary object of the invention is the provision of novel, improved delivery systems useful for both subsurface and above ground planting to supply plant nutrients with or without a moisture absorbing constituent.

Other important objects and features and additional advantages of the invention will be apparent to the reader from the foregoing and the appended claims and as the ensuing detailed description and discussion proceeds in conjunction with the accompanying drawing.

DETAILED DESCRIPTION OF THE INVENTION

Figure 1:
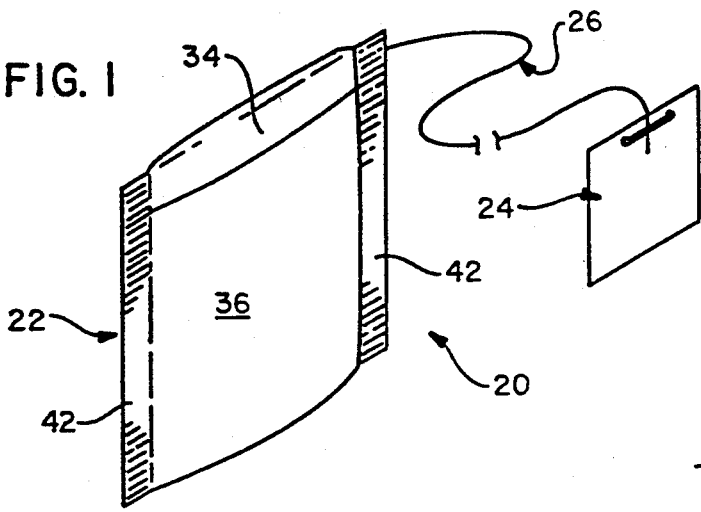
FIG. 1 is a pictorial view of one system embodying the principles of the present invention and designed to: (1) make nutrients or nutrients and moisture available to a seed or seedling, and (2) provide confirmation that a receptacle containing the active ingredients has been located in the vicinity of the seed or seedling.

Referring now to the drawing, FIG. 1 depicts one exemplary system 20 for nurturing and promoting the growth of seedlings in accord with the principles of the present invention by ensuring that moisture and essential plant nutrients are available to the seedling during the active phase of its annual growth cycle and over an extended period of time, typically from 3-5 five years. The major components of system 20 are a baglike receptacle 22 in which the active, nutrient or nutrient and moisture providing ingredients are packaged and an indicator 24 attached to receptacle 22 as by a cotton or Mylar cord or string 26.

Each receptacle 22 will typically contain one to 25 parts by weight of urea-formaldehyde or comparable fertilizer to one part of moisture absorber and from 0.5 to 5 grams of the latter constituent. The exact ratio of fertilizer to moisture absorbing constituent is not critical, and a synergistic effect can be obtained at virtually any ratio.

Both constituents will typically be employed in granular form with the granules being approximately the same size. Because of this and the fact that the densities of the constituents are approximately the same, the constituents will tend to remain uniformly mixed, optimizing the useful properties of the formulation. Also, in applications such as reforestation, where shallow planting is employed, the lower amounts of moisture absorbing material will be employed so that this material will not swell to the extent that it might push the seedling out of the ground.

Figure 2:
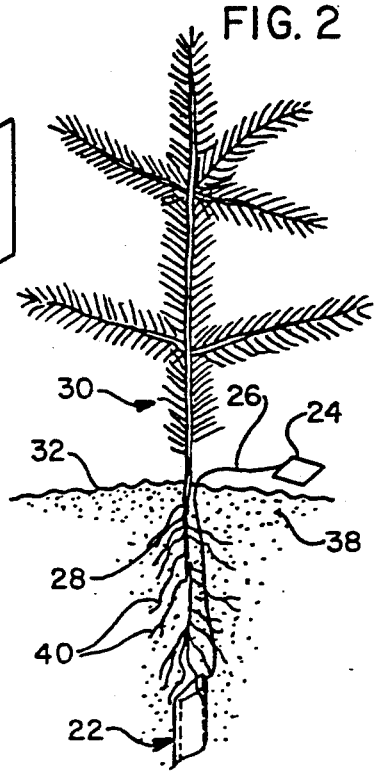
FIG. 2 is a pictorial view showing how the system of FIG. 1 is employed with the receptacle containing the active ingredients near the roots of a seedling to make the active ingredients available to the seedling and with the indicator of the system above ground to confirm that the receptacle has been emplaced.

As shown in FIG. 2, the receptacle 22 of system 20 is buried in the same hole 28 as the root system of seedling 30; and the attached tag or indicator 24 is left on or above the surface 32 of the soil in which seedling 30 is outplanted. Thus, indicator 24 provides visual confirmation that seedling 30 was, as intended, supplied with a source of nutrients and moisture.

The baglike receptacle 22 of system 20 can be fabricated from a wide variety of papers and natural and synthetic cloths. The main factors to be taken into account in selecting the paper or fabric are that it be sufficiently strong to withstand handling and planting without rupturing and that the material be sufficiently porous to allow moisture to penetrate to the interior of the bag through its side walls 34 and 36.

One particular material from which baglike receptacle 22 can advantageously be made is a heat sealable, long fiber paper (Grade 530-25 GSM Berkshire Heal Seal) manufactured by Kimberly Clark, Rosewell, Ga., USA.

Figure 3:
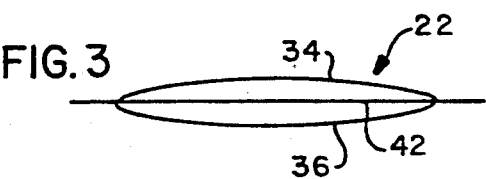
FIGS. 3-6 are top views of the receptacle showing how it expands in a typical application of the invention as a moisture absorbent composition in the receptacle absorbs water and swells until it bursts open the receptacle and deposits the moisture containing composition and a source of plant nutrients around the roots of the seedling.
Figure 4:
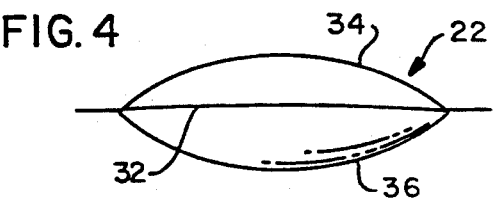
Figure 5:
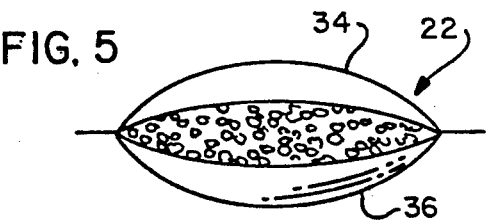
Figure 6:
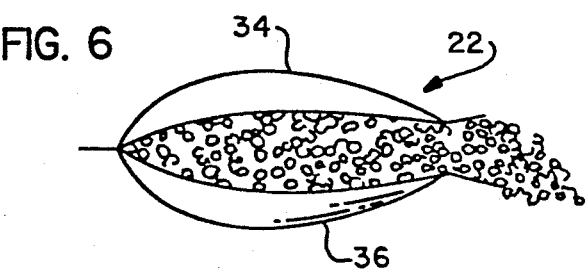

As will be apparent from the already provided, brief description of the present invention, one of the constituents in receptacle 22 in those applications of the invention in which the system is relied upon to supply moisture as well as nutrients is a hygroscopic composition which is: (1) capable of absorbing moisture from the surrounding soil 38 and thereby providing a reservoir of moisture, and (2) has a structure which can be penetrated by the fine, hairlike roots 40 of the developing seedling 30, thereby making that moisture available to the seedling during the active phase of its annual growth cycle. As moisture is absorbed by this constituent, receptacle 22 swells (compare FIG. 4 with FIG. 3) until the adhesive (not shown) bonding the side walls 34 and 36 of the receptacle together along one or more of the seams 42 between these side wall bursts (see FIG. 5). This spills the contents of receptacle 22 (see FIG. 6) in the vicinity of an onto the roots 40 of seedling 30 as is apparent from FIG. 2. This makes the nutrient and moisture supplying contents of the receptacle readily available to the seedling.

Thus, the novel delivery system 20 illustrated in FIG. 1 and just described facilities the handling and delivery of the active system constituents, supplies these constituents to the plant being nurtured in precise amounts, and makes those constituents available in a location proximate to the roots 40 of seedling 30 for efficient uptake of nutrients and moisture by the seedling's roots.

Tag or indicator 24 is preferably fabricated from a weather resistant material such as a plastic or a plastic-coated cardboard. It is preferably brightly colored so that it can be easily located. Information identifying the active ingredients in the associated receptacle 22 may be printed, typed, written, or otherwise provided on this component of delivery system 20 (The same information may be of course be similarly applied to one or both of the side walls 34 or 36 of receptacle 22 itself). Tag 24 may be impregnated with an appropriate repellent such as one of those identified hereinafter to keep it from being destroyed by rodents and other animals.

Receptacle 22 may also advantageously be impregnated with an appropriate animal or pest repellent such as one or more of those identified hereinafter. This repellent keeps pests and animals such as deer and rodents from grazing on and thereby destroying seedling 30.

It was pointed out above that a urea-formaldehyde or other nitrogen supplying fertilizer or specified character is an essential component of the novel, plant growth promoting chemical systems disclosed herein and that a hygroscopic, moisture absorbing composition may be a second essential ingredient of those systems in many applications of the invention.

The preferred hygroscopic compositions are acrylamide and starch-acrylonitrile graft polymers. Suitable acrylamide polymers are disclosed in the above-cited McKenzie, Helbling, and Cooke patients and marketed commercially by, among others, Industrial Service International, Inc., Bradenton, Fla., USA under the trade name Terrasorb-GB and by Broadleaf Industries, San Diego, Calif., USA under the designation P4.

The materials just identified are preferred in applications involving the use of urea-formaldehyde fertilizers because it has unexpectedly been found that they are effective growth media for the soil microbes relied upon to break down the molecules of urea-formaldehyde and make the nitrogen they contain available in a form in which it can be taken up and utilized by the plant being supported.

Suitable starch-acrylonitrile graft polymers are described in U.S. Pat. No. 3,985,616 issued 12 Oct. 1976 to Weaver et al. for IMMOBILIZATION OF ENZYMES WITH A STARCH-GRAFT POLYMER and are available from Industrial Services International, Bradenson, Fla., USA under the trade name Terrasorb Original. These materials differ from the polyacrylamides employed in the practice of the present invention in that they breakdown in soil, typically after a period of about one year. Thus, in applications where a build-up in the soil of the moisture absorbing materials is undesirable, for example in growing plants in hanging baskets, these materials can be employed to advantage.

The preferred hygroscopic materials have the advantage of being able to absorb and subsequently release useful quantities of moisture—typically on the order of 300 to 500 by weight of the moisture absorbing composition; and this moisture is retained for very long periods of time, even in the dryest of soils. Furthermore, the most useful ones of these compositions have cells in which the moisture is stored; and the smaller, hairlike roots of a growing plant can readily penetrate the walls of these cells and avail the plant of the moisture they contain. Thus, adequate moisture to ensure establishment of a plant is made available for a very long period and in a format in which it is readily accessible to the growing plant.

Yet another advantage of employing polyacrylamide and starch-polyacrylonitrile graft polymers moisture absorbers is that these materials are capable of hosting mycorrhizae, thus making it feasible to inoculate nutrient/moisture supplying systems with microbes of that character. This is important because endomycorrhizae are known to form symbiotic associations with a majority of plant species; and they benefit host plants by causing more effective absorption of water and more effective utilization of nutrients, especially phosphorus.

Although polyacrylamide and starch-polyacrylonitrile graft polymers are far preferred because of their absorption capacities; their ability to so store moisture that it is readily available to a plant; and their ability to support microbial activity, it may not be essential that those particular moisture providing compositions be employed in all applications of the invention. Alternatives to consider include starch-based absorbents such as those described in Increased Plant Yield Potential from Water-Jelling Absorbent Has Grower, Landscape Applications, Pacific Coast Nurseryman and Garden Supply Dealer, February 1980, pp. 21 and 22.

It was pointed about above that a source of plant nutrients is an essential constituents of the novel, plant growth and survivability promoting, chemical systems disclosed herein and that this source will typically be, or include, a urea-formaldehyde fertilizer. Urea-formaldehyde fertilizers and their properties, manufacture, and uses are discussed in detail in a publication entitled WHAT IS NITROFORM and made available by Noram Chemical Co., Wilmington, Del., USA, pages 18-32; and the reader may refer to the foregoing publication for further details on fertilizers of this type, if desired.

There are a plethora of urea-formaldehyde fertilizers that can be employed; and, as explained above, these can be tailored to exhibit optimum nitrogen release characteristics. One example of a suitable urea-formaldehyde fertilizer is marketed by Noram Chemical under the trade name Nitroform.

After the first year, the essential nutrient most often in short supply in promoting plant growth and the establishment of the plant in a foreign soil is nitrogen. By blending urea-formaldehydes which have different solubility values and activity indexes, one can provide a nitrogen source which will continue to release nitrogen to a plant during the active phases of its growth cycle for periods of up to five years. By this time, a plant can generally be well established by employing the principles of the present invention, even in poor soil and in areas where moisture is available only sporadically and/or in relatively low quantities.

That urea-formaldehyde fertilizers can be used with the marked degree of success obtainable by employing them in the manner disclosed herein in such demanding applications as reforestation is surprising. Heretofore, such fertilizers have been employed in reforestation applications in table or pellet form—for example, in the starter pellets marketed under the trade name Agriform by Sierra Chemical Co. Typically, nitrogen is released so slowly from these pellets that it is not made available in the amount needed to ensure establishment of a seed or seedling in a dry and/or nutrient poor soil before the tree reaches the dormant stage of its growth cycle. Furthermore, this approach does nothing to make available the moisture needed by the plant to survive and establish itself in the area to which it is transplanted in applications where the naturally available moisture is not adequate for this purpose.

An exemplary formulation that can be employed in the practice of the present invention is a homogeneous mixture of the following, all employed in particulate form:

| Constituent | Function | Supplier/ Manufacturer | Amount (grams) |
| --- | --- | --- | --- |
| Nitroform | Nitrogen Source | Noram Chemical Co. | 8 |
| P4 | Moisture Absorber | Broadleaf Industries | 3 |
| Sierra Controlled Release Fertilizer 17-6-10 Plus Minor | Inorganic Nitrogen, Potassium, Phosphorous, and Trace Elements | Sierra Chemical Co. | 16 |

While urea-formaldehydes are the fertilizers of choice in many cases, other slow and/or controlled release, nitrogen supplying materials may be employed instead without departing from the compass of the present invention. These include: isobutylidene diureas (IBDU); sulfur coated ureas, crotonylideneureas; and resin coated, controlled release fertilizer such as Osmocote (Sierra Chemical Co.) and Nutricote (Chisso Asahi Fertilizer Co., Toyko, Japan). Both contain mixtures of nitrogen, phosphorous, and potassium fertilizers in an envelope that expands and becomes porous to release its contents as the temperature of the soil in which the formulation is located increases. Conversely, as the weather cools, the coating shrinks and becomes less porous, inhibiting the release of, and conserving, the active ingredients of the fertilizer. Additional information on fertilizers of the character just described appears in Sierra Chemical Co. Bulletin 0787/MS/15M and in U.S. Pat. No. 3,223,518 issued 14 Dec. 1965 to Hansen for GRANULAR FERTILIZER HAVING A PLURALITY OF COATINGS AND THE PROCESS OF MAKING to which the reader may refer if he or she desires. Applications in which these alternatives to the preferred urea-formaldehyde fertilizers might be considered are those where soil microbes are lacking and moisture must be relied upon to decompose the fertilizer and release its nitrogen in plant available form and those where a plant's nutritional requirements cannot be met by a urea-formaldehyde fertilizer.

Exemplary applications where a multiyear release of nitrogen is not needed and where resin coated fertilizers can accordingly be substituted for urea-formaldehyde fertilizers in the practice of the present invention include the growing to tomatoes, pumpkins, and annual flowers. Resin coated fertilizers are useful in such applications as the growing period is only 3-4 months while such fertilizers are capable of making nutrients available for periods as long at 14 months.

In actual trials, tomato plants established with a synergistic combination of a Sierra or Chisso Asahi, resin coated fertilizer and a polyacrylamide moisture absorber (P4) were much larger than those supplied with the fertilizer alone or the P4 polyacrylamide alone, and the fruit were more plentiful. Dahlias and annuals commonly employed in hanging baskets (petunias, impatiens, geranium, begonias, and fuschias) appeared healthier and had greener leaves and larger flowers. Pumpkins were larger and greener.

Starch-polyacrylonitrile graft polymers are preferred to polyacrylamides as moisture reservoirs in applications of the character just described to avoid build-up of this constituent in the soil in which the annual plants are grown.

A preferred formulation for promoting the growth of and establishing a transplanted annual contains 16 grams of Osmocote 14-14-14 (release time of 3-4 months) and 3 grams of a starch-polyacrylonitrile polymer such as Terrasorb Original.

The principles of the present invention may be employed to particular advantage in yet another exemplary application of the invention; viz., landscaping. In this application, a longer period of support of the plant is desirable. A preferred formulation for a transplanted, landscape plant, which allows this goal to be met, contains 1-3 grams of a polyacrylamide type moisture absorber, from 8 to 16 grams of a coated, controlled release fertilizer such as Sierra Chemical Co.'s Sierra 17-6-10 (which also contains trace elements), and from 16-24 grams of urea-formaldehyde fertilizer (Nitroform).

Resin coated, controlled release fertilizers can also be incorporated in formulations designed to be used in accord with the principles of the present invention and intended for silvicultural applications. A preferred formulation of this character includes 1-3 grams of polyacrylamide gel, 8-6 grams of one of the above coated, controlled release fertilizer such as Sierra Chemical Co.'s Sierra 17-6-10 plus trace elements, and 8-16 grams of Nitroform.

Heretofore, urea-formaldehyde fertilizers and or resin coated, controlled release fertilizers have not been employed in admixture as they are in the formulations described above because of separation problems and because of abrasion of the resin coating, which results in premature release of the active ingredients of the coated fertilizer. These problems are eliminated by the novel delivery system discussed above and illustrated in FIG. 1 which, as discussed above and at the same time, also makes it possible to deliver precise quantities of the active ingredients (nutrient or nutrient and moisture providing composition) to the plant supported by the formulation in accord with the principles of the present invention. Thus, delivery system 20 and others employing its novel principles eliminate an important either/or constraint on the use of fertilizers and solve a major application rate-related problem in the application of fertilizers to outplanted seedlings.

Formulations in accord with the principles of the present invention in which urea-formaldehyde is replaced by, or admixed with, an IBDU, sulfur coated urea, crotonylideneurea, and/or a resin coated, controlled release fertilizer such as one of those identified above differs from those employing only urea-formaldehyde(s) as a nitrogen source in that IBDUs, sulfur coated ureas, crotonylidene ureas, and resin coated, controlled release fertilizers are not broken down by microbial action. Nevertheless, the moisture supplying hygroscopic composition and the nutrient supply will still result in the formulation synergistically supporting the growth and establishment of the plant with which it is associated.

Other nutrients and adjuncts can be combined with the nitrogen supplying fertilizer(s) and the moisture absorbent material to optimize the formulation for different applications of the invention. These include compounds capable of providing potassium and phosphorous and thereby making a complete fertilizer available as well as sources of micronutrients.

Of the other plant nutrients that may be supplied, phosphorous is perhaps the most important in establishing a young seedling as this element assists in root development. Two different sources of phosphorous may be employed to advantage. The first is a conventional source such as trisuperphosphate to make phosphorous available during the first year of growth. Additional phosphorous is then made available during subsequent years by employing potassium phosphate or plastic coated trisuperphosphate.

Representative of other optional adjuncts that may be employed to advantage in the novel nutrient/moisture providing systems disclosed herein are:

TABLE I
FERTILIZERS

| | |
|---|---|
| Ammonia | Orthophosphoric acid |
| Ammonium phosphate | *Calcium phosphate |
| *Ammonium sulfate | Phosphoric acid |
| *Diammonium phosphate | Dicalcium phosphate |
| *Ammonium nitrate | *Calcium magnesium phoshate |
| Sodium nitrate | Tricalcium phoshate |
| *Ammonium metaphosphate | *Calcium metaphosphate |
| *Calcium nitrate | Potassium metaphosphate |
| *Potassium nitrate | Potassium hydrogen phosphate |
| Ammonium chloride | Potassium chloride |
| *Phosphate rock | *Potassium sulfate |
| Basic slag | *Sulfate of potash magnesia |
| Trisodiumphosphate | Potassium carbonate |
| *Superphosphate | *Urea |

TABLE II
HERBICIDES

| | |
|---|---|
| 2,4-D | 2,4,5-T |
| 4,-CPA | 2-(MCPP) |
| 2-(3,4,-DP) | 4-(2,4-DB) |
| 4-(2,4,5-TB) | 4-(4-CPB) |
| 2,4,5-TES | 2,4-DEB |
| Dalapon | DCV |
| CDEA | CIPC |
| Barban | Fenuron |
| Monuron | Diuron |
| PCP | DNAP |
| 2,3,6-TBA | NPA |
| PMA | HCA |
| MH | DCB |
| Amitrole-T | EXD |
| Erbon | CEPC |
| EPTC | DIPA |
| CBMM | CBDM |
| BMM | AMS |
| SMDC | Amiben |
| *Simazine | Ipazine |
| Propazine | Semetone |
| Aratone | Acrolein |
| Banvel D | Dipropalin |
| Calcium Cyanamid | Diphenylacetonitrile |
| 3,4-dilchloropropionanilde | Zytron |

TABLE II-continued
HERBICIDES

| | |
|---|---|
| MCPA | Cacodylic acid |
| 2-(2,4-DP) | 3,4-DA |
| 2-(4-CPP) | Silvex |
| 2-(3,4-DB) | 4-(MCPB) |
| MCPES | Sesone |
| 2,2,3-TPA | TCA |
| IPC | CDAA |
| CDEC | BCPC |
| Monuron TCA | Fenuron TCA |
| DNBP | Neburon |
| 2,3,5,6-TBA | DNO |
| KOCN | Endothall |
| TCB | IPX |
| OCH | Amitrole |
| PBA | MAA |
| EBEP | CPPC |
| CBFM | DMA |
| BDM | CBM |
| DMTT | Dichlone |
| Atrazine | Fenac |
| Chlorazine | Trietazine |
| Diquat | Prometone |
| Trifluralin | 2,4-DEP |
| Bandane | Betazan |
| *Dacthal | p-dichlorobenzene |
| Chlordane | Lorox |

TABLE III
FUNGICIDES

| | |
|---|---|
| *Captan | Copper oleate |
| Copper | *1,1-Bis(p-chlorophenyl)- |
| Sulfur | 2,2,2-trichloroethanol |
| *Ferbam | *Mylone |
| *Karathane | *Phaltan |
| *Maneb | *Thiram |
| *EMMI | Phenylmercuric acetate |
| *PHIMM | *Zineb |
| Dyrene | *Ziram |
| *Terrachlor | 1,2,4 trichloro-3-5- |
| *Dithane M45 | dinitrobenzene |

TABLE IV.
GROWTH REGULATORS

*Gibberellin and related compounds
N¹-Benzylaminopurine compounds
Maleic hydrazide
Colchicine
2-isopropyl-4-dimethylamino-5-methylphenyl-1-piperidinecarboxylate methyl choride and related compounds
2,4-dichlorobenzyltributylphosphonium chloride
(2-chloroethyl)-trimethylammonium chloride and related compounds
2,3-dichloroisobutyric acid
6-furfurylaminopurine (Kinetin) and related compounds
2-pyridinethiol,1-oxide
2,3,6 trichlorobenzoic acid
2,6-dichlorobenzoic acid
*Indole-3-acetic acid
Indole-3-butyric acid
Alpa-naphthaleneacetic acid and related compounds
Adenine
N-m-tolylphthalamic acid (Duraset)
2,3,5-triiodobenzoic acid
Benzthiozole-2-oxyacetic acid
B-hydroxethyl-hydrazine
Indole-3-alanine
Isochlorotetracycline and related compounds
Succinamic acid

TABLE V
INSECTICIDES AND NEMATOCIDES

| | |
|---|---|
| Allethrin | Kelthane |

TABLE V-continued
INSECTICIDES AND NEMATOCIDES

| | |
|---|---|
| DDT | Ethlon |
| Methoxychlor | TEPP |
| Chlordane | *Rotenone |
| Aramite | Endrin |
| Lindane | Heptachlor |
| Calcium Arsenate | BHC |
| Copper sulfate | Toxaphene |
| *Pyrethrum | *Sevin |
| *Malathion | OW-9-acaricide pyrene 1330 |
| *Parathion | Ovotran |
| Chlorobenzilate | Tedion |
| Dieldrin | |
| Aldrin | |

TABLE VI
ANIMAL REPELLENTS

| | |
|---|---|
| Allyl isothiocyanate | Tobacco |
| Paradichlorobenzene | Orthodichlorobenzene |
| Cresylic acids | Piperonylbutoxide |
| Bone oil | Thiram |
| Menthlynonylketone | Naphthalene |
| Nicotene | Paradichlorobenzene |
| Polymerized butene | *Essence of Canine, Weasel, or other animal |

TABLE VII
SOIL STERILANTS

| | |
|---|---|
| Carbon tetrachloride | Methyl bromide |
| Etylene dibromide | Mylone |
| Calcium cyanamide | Nemagon |
| Carbon disulfide | Orthodichlorobenzene |
| Paradichlorobenzene | Sodium methyl dithio- |
| Ethylene dichloride | carbamate |
| Chloropicrin | |

TABLE VIII.
INSECT REPELLENTS

| | |
|---|---|
| Benzol | N,N-diethyl meta tolu- |
| Diphenylamine | amide |
| Benzyl benzoate | Diethyl phthalate |
| Butoxypolypropylene | Di-n-popyl isocincho- |
| glycol | meronate |
| Dibutyl phthalate | Lindane |
| Di-n-butyl succinate | |

TABLE IX
ADJUVANTS

| | |
|---|---|
| Dyes | Diluents |
| Sticking agents | Conditioning agents |
| Spreaders | *Chelates |
| Surfactants | *Chelating agents |
| | Methyl cellusose |
| | Diatomacious clay |

TABLE X
TRACE ELEMENTS

| | |
|---|---|
| Iron | Copper |
| Manganese | Zinc |
| Boron | Iodine |
| Molybdenum | Calcium |
| Magnesium | Sulfur |

Table X shows the required element but not necessarily the chemical compound which is added. The above trace elements may, for example, be added as salts or chelates or in their elemental state.

Particularly useful in the practice of the present invention are those compositions identified in Tables I, II, III, IV, V, VI, and IX by asterisks.

Several references which identify the commonly used names in Tables I-X are:

(1) Pesticide Chemicals Official Compendium, Association of American Pesticide Control Officials, Inc., 1962 edition;

(2) Frear, D. E. H., Pesticide Index, 1961 edition, College Science Publishers, State College, Pa.;

(3) Pesticide Research Institute, Guide to the Chemicals Used in Crop Protection, April 1961, Research Branch, Canada Department of Agriculture; and (4) Terminology Committee Weed Society of America, Weeds 8, No. 3, July 1960. Identification of designations used in Table II for Herbicides.

The formulations disclosed herein, in addition to including optional constituents such as those identified in Table I-X, may be mixed with such conventional growth media as vermiculite, perlite, sand, sawdust, wood pulp, bark, peat, and top soil to provide a self-contained, plant growth mix.

Also, as discussed above, the moisture absorbing and reservoir providing constituent of the system can be eliminated in those applications of the invention where rainfall and/or irrigation supply adequate moisture.

Figure 7:
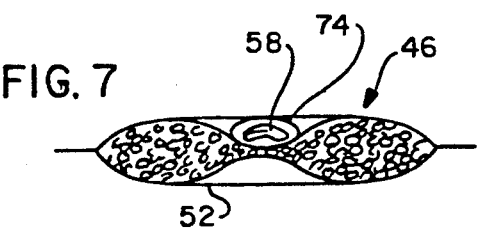
FIGS. 7-9 are pictorial views of nutrient and nutrient/moisture supplying systems also embodying the principles of the present invention; in these systems, the active constituents are contained in a pillow which is designed to be placed on the surface of the seed lot, and one or more seeds—uncoated, coated, or embedded in an appropriate carrier—are bonded to the pillow.
Figure 8:
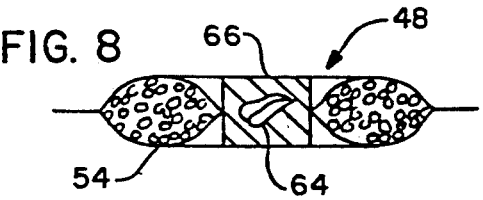
Figure 9:
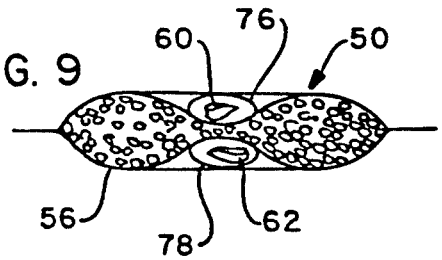

It was pointed out above that delivery systems other than that shown in FIG. 1 may equally well be employed to supply nutrients and/or moisture to plant life in accord with the principles of the present invention. FIGS. 7, 8, and 9, in this respect, depict pillows 46, 48, and 50 which are designed for depositing on a surface as opposed to burial. Each of these pillows includes a baglike receptacle 52, 54, or 56 of the character employed in system 20 and identified by reference character 22. One or more seeds (identified by reference character 58 in FIG. 7 and by reference characters 60 and 62 in FIG. 9) may be bonded to receptacle 52 or 56 with an appropriate, biodegradable adhesive such as Klu-cel, a hydroxypropyl cellulose manufactured by Hercules, Wilmington, Del., USA. Alternatively, as shown in FIG. 8, the seed (in this case identified by reference character 64) can be embedded in a conventional manner in a porous, charcoal block or carrier 66 bonded or otherwise attached to receptacle 54.

As suggested above, pillows 46, 48, and 50 are planted by laying them on the surface of the ground. The hygroscopic material in the receptacle (for example, the receptacle 52 or pillow 46) absorbs moisture in a manner akin to that discussed above in conjunction with FIGS. 4 and 5, thereby making nutrients and moisture available to the seedling 67 sprouted from the germinated seed 58. Receptacle 52 is fabricated of a material that will allow moisture to penetrate to the interior of the bag and, also, allow the roots 68 of seedling 66 to penetrate through the receptacle into the ground.

The pillows just described have the additional advantage that they can be planted essentially any time on the surface of the seed lot or even on top of the snow if the ground is covered.

Bursting of the bag is undesirable in these surface planting applications of the present invention employing pillows of the character just described and illustrated in FIGS. 7-9. Consequently, a less absorbent polyacrylamide or starch-acrylonitrile graft polymer and/or a stronger paper or cloth than employed in receptacle 22 may be employed to reduce the possibility of this happening.

It is not necessary that charcoal be employed as the seed carrier in that embodiment of the invention shown in FIG. 8. Rock wool and other inert substances which will allow rapid, unimpeded germination of seed 64 can instead by employed.

It was pointed out above that the seed 58 attached to the receptacle 52 of pillow 46 and the seeds 60 and 62 attached to the receptacle 56 of pillow 50 may be coated, a technique commonly employed for seed preservation. The coatings (identified by reference character 74 in FIG. 7 and by reference characters 76 and 78 in FIG. 9) may be of any of the materials commonly employed for this purpose such as, for example, diatomaceous earth and methylcelluose.

Double seeded pillows of the character illustrated in FIG. 9 and identified by reference character 56 are preferred in applications where the specie is one with poor germination characteristics, or the seed lot and/or climatic conditions are not conducive to germination, or the roots of the germinated seed are not capable of penetrating the material from which receptacle 56 is fabricated.

As in the case of the delivery system 20 discussed above, the moisture absorbing constituent can be omitted from delivery systems 46 . . . 50 in those applications of the invention where rainfall and/or irrigation make this constituent unnecessary.

Figure 11:
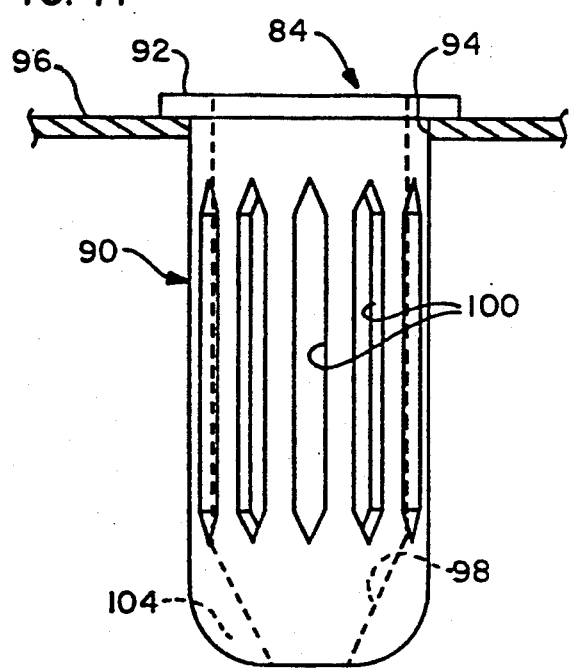
FIG. 11 is a side view of yet another system for making nutrients and moisture available to a seedling in accord with the principles of the present invention; in this embodiment of the invention, those compositions acting as sources of the moisture and plant nutrients are incorporated in the material from which the container of a tray-type seed germinating system is fabricated.
Figure 12:
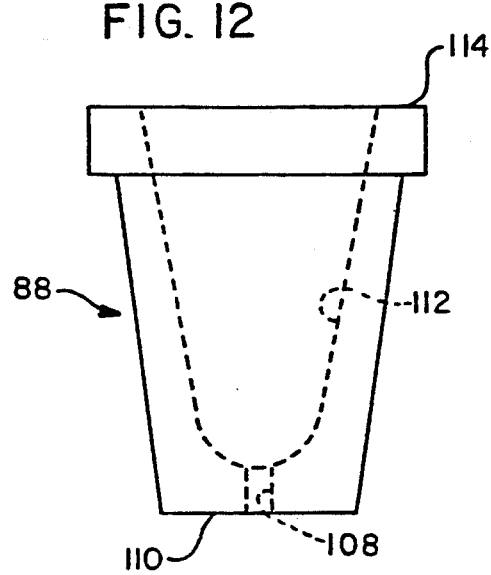
FIG. 12 is a view of a still further embodiment of the invention in which the active ingredients of the plant nurturing system are also incorporated in a container material, the container in this case being one intended for a bench-type germination and growing out process.
Figure 10:
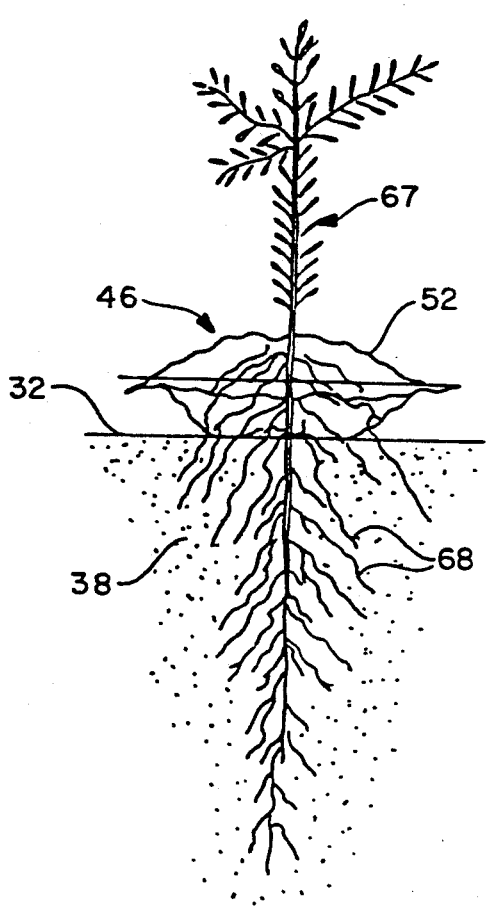
FIG. 10 is a view, similar to FIG. 2, of a seedling in the course of being established from a seed planted by use of a pillow as shown in FIG. 7.

It was pointed out above that the novel plant nurturing techniques and systems disclosed herein are also readily adaptable to conventional tray- and bench-type seed germination processes and that, in such applications, the urea-formaldehyde and/or other fertilizer(s), a hygroscopic moisture absorber, and any optional plant nutrients, adjuncts, or other constituents that may be beneficial are mixed with the growing medium or incorporated in the material from which the seed germination containers are fabricated. Containers of this character and respectively intended for tray- and bench-type germination are illustrated in FIGS. 11 and 12, respectively, and identified by reference characters 84 and 88.

Seed germination container 84 has an elongated, hollow, cylindrical body 90 and an integral lip 92 at the upper end of that body. Seed germination container 84 is designed to depend through an opening 94 in a conventional tray 96 with lip 92 supporting the container from the tray as shown in FIG. 11. Lip 92 also facilitates the handling of container 84 and the seedling grown out in that container by planters and other mechanical equipment. In addition, this lip can be employed as a mount for an anti-browsing tube similar to those made available by Conwed Netting, Minneapolis, Minn., USA under the trade name Vexar. These tubes are installed over outplanted seedlings to keep rodents, deer, etc. from eating the tender young seedlings.

An opening 98 in the lower end of container body 90 provides drainage and egress for a tap root. Elongated, vertically extending slots 100 spaced around the periphery of the container body promote root development by allowing other roots of the developing seedling to grow freely.

Container 84 will typically be fabricated from a combination of: polyethylene; epsilon caprolactone; monomethylol urea; methylene diurea; conventional phosphorus and potassium providing compounds; sources of micronutrients such as ferosulfate, manganese sulfate, zinc sulfate, copper sulfate, sodium borate, and sodium molybdate; and a hygroscopic, moisture reservoir providing composition of the character discussed above and employed in other applications of the invention.

A biodegradable inner coating (not shown) may also be provided to inhibit the activation of the fertilizer until such time as this may be of benefit to the plant being nurtured. Microbial and thermal catalysts can be incorporated in the coating to initiate and control its decomposition as can initiators responsive to thermal changes—for example, freezing temperatures—in the ambient surroundings.

The resulting container is preferably provided with a biocidally treated, polyvinylalcohol/starch or comparable outer coating (likewise not shown) to inhibit degradation of the container until the seedling grown out in the container in outplanted.

In this application of the invention, both the biodegradable container 84 and the seedling established in that container are planted in a an appropriate hole in the seed lot, typically dug with a dibble. Container 84 will thereafter disintegrate at a controlled rate, making the nutrients and hygroscopic compositions incorporated in it available to support the growth and promote the survivability of the seedling.

The fabrication of biodegradable plant containers from materials of the character discussed above except for the inclusion of plant nutrients and a hygroscopic polyacrylamide or starch-polyacrylonitrile graft polymer in accord with the principles of the present invention is described in detail in Kirk-Othmer, ENCYCLOPEDIA OF CHEMICAL TECHNOLOGY, SUPPLEMENT VOLUME, ALCOHOL FUELS TO TOXICOLOGY, Third Edition, John Wiley & Sons, New York, N.Y., USA, 1984, pp. 645–647. For that reason and because the details of the fabrication process are not part of the present invention, they will not be discussed herein.

Turning now to FIG. 12, the container 88 intended for bench-type seed germination is of the conventional, frustoconical configuration with a hole 108 in its bottom wall 110 for drainage and to accommodate the downward growth of a tap root. This container is also fabricated of a biodegradable, nutrient and moisture supplying formulation such as that discussed above in conjunction with container 84. The internal side wall 102 of container 84 is preferably tapered inwardly and downwardly to provide an increased concentration of active ingredients in the area (identified by reference character 104) where maximum root development can be expected to occur.

The interior cavity 112 of container 88 is filled with a conventional, biodegradable plant growth medium such as ground tree bark or peat moss. Again, it is intended that both the container and the seedling grown out in it be planted in the seed lot so that, as it decomposes, the container will continue to make plant nutrients and moisture available to the seedling to promote its growth and ensure its survivability. Biodegradability of the container (and also container 84, through perhaps to a lesser extent) is also important because the container would otherwise restrict the development of the root system of the transplanted seedling. At the same time, control of this biodegradability is required to ensure that the container will remain structurally intact until the transplanting operation is completed.

The upper lip or rim 114 on container 88, like the lop 92 of container 84, facilitates the handling of container 88 and its seedling with mechanical equipment and/or serves as a mount for an anti-browsing tube.

The efficacy of the novel, herein-disclosed method for promoting the growth and survivability of seeds and seedlings is demonstrated by the above-discussed trials involving tomatoes, annuals, and pumpkins and by field trials conducted on Vancouver Island in the Province of British Columbia, Canada and involving Western Hemlock, Douglas Fir, and Sitka Spruce seedlings. The trial was conducted in a gravel soil with no additional moisture of nutrients supplied. Measured precipitation during the trials was only 111 mm., 43 mm. of which feel in the first two weeks after planting.

Plugs (1–0) of the foregoing species were transplanted in the test site on 16 April in holes in which a plant growth and survivability system embodying the principles of the present invention has first been placed. The medium placed in each hole was formulated as a particulate mixture and contained:

| Ingredient | Quantity |
|---|---|
| Nitroform | 9 g (3.42 g of nitrogen) |
| Superphosphate | 1 g (0.2 g calculated as $P_2O_5$) |
| Rock Phosphate | 0.5 g (0.18 g calculated as $P_2O_5$) |
| Dolomite | 0.75 g |
| Micromax (micronutrients) | 0.25 g |
| Potassium Nitrate | 0.25 g ($N_2$ = 0.03 g, $K_2O$ = 0.11 g) |
| Terrasorb A.G. | 0.2 g |

The following observations of a randomly selected treated specimen of each specie and a similarly selected control were made on 1 June, 9 July, 8 August, and 28 September.

| WESTERN HEMLOCK | |
|---|---|
| Treated Specimen | Untreated Control |
| 1 June | |
| Excellent color | Slight chlorosis |
| Good continuous growth | Growth interrupted by |
| No transplant shock | transplant shock |
| Thick full needles | Needles hard and sparse |
| 8 July | |
| Color good | Severe chlorosis on tip |
| Growth continues | No growth |
| Needles still soft and lush | Needles hard and sparse |
| 8 August | |
| Color fading as dormancy from lack of moisture sets in | Color and needle texture imply a dormant state |
| Each of the treated plants has a considerably longer leader than any of the controls | This season's growth has been severely limited by drought |
| 26 September | |
| Color returning as matrix resonds to a small amount of rain in mid-August This particular transplant has doubled in height this year in spite of a total of only 111 mm of rain at the test site | This season's growth has been lost and the tree left in a weakened state to continue its establishent in the following year |

On September 26, the randomly selected, treated specimen and the second untreated control were carefully exhumed.

The untreated control, while alive, had not developed any top growth at all due to the dry site and light rainfall. Upon exhumation, the plug shape was still strongly apparent, demonstrating that root growth has been poor.

The treated specimen had more than doubled in top growth, and root development was equally aggressive. By virtue of the support afforded by the nutrient/moisture supplying system, the roots of the plant had ventured down to an area where ground moisture was more readily available.

| DOUGLAS FIR | |
|---|---|
| Treated Specimen | Untreated Control |
| 1 June | |
| Excellent color | Mild chlorosis |
| Thick soft needles | Needles more sparse |
| Bud formation beginning | Bud formation beginning |
| 9 July | |
| Color excellent | Chlorosis is apparent |
| A new flush of free growth has begun after a light rainfall on July 1st | Buds formed Tree remains dormant |
| 8 August | |
| In spite of severe drought 3-4 cm of "free growth" is apparent on this specimen's leader and will continue to be dormant until next spring | While this tree appears healthy, it has been in a state of dormancy since May |
| 26 September | |
| This tree has put on an additional 3-4 cm of free growth throughout an exceptionally dry season Bud formation is complete and dormancy has set in in preparation for next Spring | Dormancy continues |

No top growth developed in the untreated control after it was transplanted. Root development was acceptable as the tree had tapped into lower level moisture reserves. However, root growth was not as well distributed as that of the treated specimen.

The top growth of the treated specimen has increased by 43% due to bud break in early July and free growth through August. Rainfall during these two month was only 26.7 mm with 23 mm falling between July 1st and 9th. Root growth was strong and evenly balanced. This tree was able to tap into a level of the soil where ground moisture was more readily available.

| SITKA SPRUCE | |
|---|---|
| Treated Specimen | Untreated Control |
| 1 June | |
| Excellent color to bright blue in some specimens | Chlorosis Slight transplant shock |
| Thick soft needles | Needles hard and sparse |
| Lush growth | |
| 8 July | |
| Color excellent | Chlorosis |
| Needles soft and thick | Needles sparse |
| Strong tip growth apparent | Tip growth restricted to leader |
| 8 August | |
| Color good | Color poorer |
| Healthy tip growth | Needles sparse |
| Excellent bud formation | Bud development poor |
| 26 September | |
| Color good | Bud development poor |
| Bud development healthy | Spring growth will be restricted |
| Tree in excellent shape for fall dormancy | |

The top growth of the untreated control was non-existent for the year. Bud formation was acceptable although not as strong as that of the treated specimen. Root development was acceptable but much poorer than that of the treated specimen.

The top growth of the treated specimen was 23% since transplanting. But set was excellent. Root development was strong, and the tree was able to tap into a lower level moisture reserve.

Particularly noteworthy in the foregoing tests is that the treated specimens not only experienced a one hundred percent survival rate under the severe drought conditions under which they were grown but, also, exhibited a degree of growth and a state of health surpassing what would be expected in the case of conventionally transplanted seedlings in years in which rainfall is normal.

In the same trials, two additional sets of the Douglas Fir seedlings were respectively treated with Terrasorb (3 grams) along and Agriform tables along (these contained 21 grams of active material with 20% N, 10% P, and 5% K).

The seedlings treated with the moisture absorbent along became very chlorortic from a lack of nutrients. Even though a second budbreak appeared, results were poor. The trees planted with Agriform tables only remained dormant, and growth did not occur during the growing season.

To a large extent, the principles of the present invention have above been developed, and its attributes and advantages described, with reference to one particular application of the invention; viz., the reforestation of logged or otherwise denuded areas. This was done solely for the purposes of clarity and in the interest of brevity and because reforestation is a demanding and currently important application of the invention. Therefore, the scope of protection that is sought is intended to be limited only by the appended claims.

Thus, the invention disclosed and claimed herein may be embodied in specific forms other than those described above without departing from the spirit or essential characteristics thereof. The present embodiments are therefore to be considered in all respects as illustrative and not restrictive, the scope of the invention being indicated by the appended claims rather than the foregoing description. All changes which come within the meaning and range of equivalency of the claims are therefore intended to be embraced therein.

What is claimed is:

1. A method of promoting the growth of a seedling which comprises the steps of: locating in physical proximity to said seedling or a seed from which the seedling can be grown, and in intimate association therewith, the combination of a nitrogen supplying fertilizer which is degradable by microbial action and a moisture absorbent composition which is effective to: supply moisture to said seed or seedling and promote the growth of soil microbes that are capable of converting the nitrogen in said fertilizer to a plant available form; and inoculating the combination of the nitrogen supplying fertilizer and the moisture absorbing composition with at least one microbe which is symbiotic with, and capable of benefiting the seedling by, promoting the uptake of moisture and the utilization of nutrients by the seedlings.

2. A method of promoting the growth of a seedling which comprises the step of locating, in physical proximity to said seedling or a seed from which the seedling can be grown, and in intimate association therewith, the combination of a nitrogen supplying fertilizer which is degradable by microbial action and a moisture absorbent composition which is effective to: supply moisture to said seed or seedling and promote the growth of soil microbes that are capable of converting the nitrogen in said fertilizer to a plant available form, said fertilizer containing a mixture of urea-formaldehyde and the CWIN and the activity index of each urea-formaldehyde being so adjusted that the urea-formaldehydes are degradable at different rates by microbial action and nitrogen is thereby made available to said seedling over an extended period of time which may span more than one growing season.

3. A method of promoting the growth of a seedling: which comprises the step of locating, in physical proximity to said seedling or a seed from which the seedling can be grown, and in intimate association therewith, the combination of a nitrogen supplying fertilizer which is degradable by microbial action and a moisture absorbent composition which is effective to: supply moisture to said seed or seedling and promote the growth of soil microbes that are capable of converting the nitrogen in said fertilizer to a plant available form;

said nitrogen supplying fertilizer and said moisture absorbing composition being provided, in loose form, in a sealed receptacle which is fabricated from a porous material and which can be burst by the migration of moisture into the container through the porous material, the absorption of moisture by said moisture absorbent composition, and the subsequent swelling of said composition to thereby release said nitrogen supplying fertilizer and said moisture absorbent composition from said receptacle in the vicinity of the seed or the roots of the seedling; and said receptacle being buried with the root system of the seedling when said seedling is outplanted and an indicator physically attached to said receptacle by means permitting said indicator to be left above ground to provide verification of the burying of the receptacle with the root system of the seedling.

4. A method of so planting a seed as to promote the health and growth of a seedling germinated from said seed over an extended period of time, said method comprising the steps of:

planting said seed as a component of a delivery system which includes, in addition to the seed, and in intimate association therewith: (a) a first composition which is degradable by microbial action to provide nitrogen to the seedling germinated from said seed in a plant available form, and (b) a second composition which is so capable of controlling said degradation of said first composition that said nitrogen is made available to the seedling only during those time periods and under those conditions in which the seedling is capable of growing, thereby extending the period over which nitrogen can be made available to the seedling from said delivery system; and inoculating the combination of first and second compositions with at least one microbe which is symbiotic with, and capable of benefiting the seedling by, promoting the uptake of moisture and the utilization of nutrients by the seedling.

5. A method of so planting a seedling as to promote the health and growth of a seedling germinated from said seed over an extended period of time in which the seed is planted as a component of a delivery system which includes, in addition to the seed, and in intimate association therewith: (a) a first composition which is degradable by microbial action to provide nitrogen to the seedling germinated form said seed in a plant available form, and (b) a second composition which is so capable of controlling degradation of said first composition that said nitrogen is made available to the seedling only during those time periods and under those conditions in which the seedling is capable of growing, thereby extending the period over which nitrogen can be made available to the seedling from said delivery system, said method including the step of incorporating the first composition in, and subsequently supplying nitrogen to the seedling from, a mixture of urea-formaldehydes, the CWIN and the activity index of each urea-formaldehyde being so adjusted that the urea-formaldehydes are degradable at different rates by microbial action and nitrogen is thereby made available to said seedling over an extended period of time which may span more than one growing season.

6. A method of establishing a seedling in a manner which promotes the growth and survivability of the seedling, that method including the steps of associating with the seedling or a seed which can be germinated to provide the seedling prior to, or during outplanting:

a. a first composition which is degradable into available nitrogen by microbial action, and b. a second composition which:
 (i) provides a growing medium for the microbes relied upon for such degradation, and
 (ii) is capable of absorbing moisture and thereby becoming a source of moisture which is available to the seedling over an extended period of time;

said first composition and said second composition being provided, in loose form, in a sealed receptacle which is fabricated from a porous material and which can be burst by migration of moisture into the receptacle through said porous material, the absorption of moisture by said moisture absorbent composition, and the subsequent swelling of said composition to thereby release said nutrients and said moisture absorbent composition from said receptacle in the vicinity of or on said seed or the roots of said seedling; and said receptacle being buried with the root system of the seedling when said seedling is outplanted and an indicator physically attached to said receptacle by means permitting said indicator to be left above ground to provide verification of the burying of the receptacle with the root system of the seedling.

7. A method of promoting the growth of a seedling which comprises the steps of: locating in close physical proximity to the seedling or a seed which can be germinated to provide said seedling a sealed receptacle which is fabricated from a porous material and which contains, in loose form, a source of plant nutrients and a moisture absorbing composition which is thereafter, and upon the migration of moisture into the receptacle through said porus material and absorption of said moisture: effective to burst said receptacle and release the plant nutrient source and the moisture absorbing composition therefrom and in the vicinity of the seed or seedling;

said receptacle being buried with the root system of the seedling when said seedling is outplanted and an indicator physically attached to said receptacle by means permitting said indicator to be left above ground to provide verification of the burying of the receptacle with the root system of the seedling.

8. A method of promoting the growth of a seedling which comprises the steps of: locating in close physical proximity to the seedling or a seed which can be germinated to provide said seedling a receptacle which contains a source of plant nutrients and a moisture absorbing composition which is thereafter, and upon the absorption of moisture: effective to burst said receptacle and release the plant nutrient source and the moisture absorbing composition therefrom and in the vicinity of the seed or seedling, said source of plant nutrients being or containing a mixture of urea-formaldehydes, the CWIN and the activity index of each urea-formaldehyde being so adjusted that the urea-formaldehydes are degradable at different rates by microbial action and nitrogen is thereby made available to said seedling over an extended period of time which may span more than one growing season.

9. A method of promoting the growth of a seedling which comprises the steps of:
locating in close physical proximity to the seedling or a seed which can be germinated to provide said seedling a receptacle which contains a source of plant nutrients and a moisture absorbing composition which is thereafter, and upon the absorption of moisture: effective to burst said receptacle and release the plant nutrient source and the moisture absorbing composition therefrom and in the vicinity of the seed or seedling; and
inoculating the combination of said source of plant nutrients and said moisture absorbing composition with at least one microbe which is symbiotic with, and capable of benefiting the seedling by, promoting the uptake of moisture and the utilization of nutrients by the seedling.

10. A method of promoting the growth and establishment of a seedling which comprises the step of locating in proximate relation to the seedling or a seed from which the seedling can be germinated, a receptacle containing a source of a plant nutrient, said receptacle being: (a) fabricated of a material through which the plant nutrient can be released and (b) being:
a urea-formaldehyde,
a mixture of urea-formaldehydes
with different release rates,
a sulfur-coated urea,
an isobutylidene diurea,
a crotonylidene urea,
a resin coated,
controlled release fertilizer, or
a mixture of two or more of the foregoing;
said receptacle being buried with the root system of the seedling when said seedling is outplanted and an indicator physically attached to said receptacle by means permitting said indicator to be left above ground to provide verification of the burying of the receptacle with the root system of the seedling.

11. A method of promoting the growth and establishment of a seedling which comprises the step of locating in proximate relation to the seedling or a seed from which the seedling can be germinated, a receptacle containing a source of a plant nutrient, said receptacle being: (a) fabricated of a material through which the plant nutrient can be released and (b) being:
a urea-formaldehyde,
a mixture of urea-formaldehydes
with different release rates,
a sulfur-coated urea,
an isobutylidene diurea,
a crotonylidene urea,
a resin coated,
controlled release fertilizer, or
a mixture of two or more of the foregoing,
the source of the plant nutrient being or containing a mixture of urea-formaldehydes, the CWIN and the activity index of each urea-formaldehyde being so adjusted that the urea-formaldehydes are degradable at different rates by microbial action and nitrogen is thereby made available to said seedling over an extended period of time which may span more than one growing season.

12. A method of promoting the growth and establishment of a seedling which comprises the steps of:
locating in proximate relation to the seedling or a seed from which the seedling can be germinated, a receptacle containing a source of a plant nutrient, said receptacle being: (a) fabricated of a material through which the plant nutrient can be released and (b) being:
a urea-formaldehyde,
a mixture of urea-formaldehydes
with different release rates,
a sulfur-coated urea,
an isobutylidene diurea,
a crotonylidene urea,
a resin coated,
controlled release fertilizer, or
a mixture of two or more of the foregoing; and
inoculating the combination of the source of the plant nutrient and a moisture absorbing composition with at least one microbe which is symbiotic with, and capable of benefiting the seedling by, promoting the uptake of moisture and the utilization of nutrients by the seedling.

* * * * *